(12) United States Patent
MacPherson

(10) Patent No.: US 9,323,042 B2
(45) Date of Patent: Apr. 26, 2016

(54) OPTICALLY VARIABLE DEVICES, THEIR PRODUCTION AND USE

(75) Inventor: Charles Douglas MacPherson, Santa Barbara, CA (US)

(73) Assignee: Nanotech Security Corp., Burnaby, BC (CA)

( * ) Notice: Subject to any disclaimer, the term of this patent is extended or adjusted under 35 U.S.C. 154(b) by 408 days.

(21) Appl. No.: 13/642,504

(22) PCT Filed: Apr. 21, 2011

(86) PCT No.: PCT/CA2011/000461
§ 371 (c)(1),
(2), (4) Date: Jan. 21, 2013

(87) PCT Pub. No.: WO2011/130843
PCT Pub. Date: Oct. 27, 2011

(65) Prior Publication Data
US 2013/0114122 A1 May 9, 2013

Related U.S. Application Data

(60) Provisional application No. 61/326,365, filed on Apr. 21, 2010.

(51) Int. Cl.
| | | |
|---|---|---|
| *G02B 26/00* | (2006.01) | |
| *B32B 7/06* | (2006.01) | |
| *B32B 27/36* | (2006.01) | |
| *G07D 7/02* | (2006.01) | |
| *B42D 25/29* | (2014.01) | |
| *B42D 25/324* | (2014.01) | |

(52) U.S. Cl.
CPC ............ *G02B 26/001* (2013.01); *B32B 7/06* (2013.01); *B32B 27/36* (2013.01); *B42D 25/29* (2014.10); *G07D 7/02* (2013.01); *B42D 25/324* (2014.10); *B42D 2033/10* (2013.01); *B42D 2033/12* (2013.01); *B42D 2033/18* (2013.01); *B42D 2033/32* (2013.01); *B42D 2035/24* (2013.01); *B42D 2035/26* (2013.01); *B42D 2035/34* (2013.01)

(58) Field of Classification Search
CPC ....................................................... G02B 26/00
USPC .................................................. 359/290–298
See application file for complete search history.

(56) References Cited

U.S. PATENT DOCUMENTS

| | | | |
|---|---|---|---|
| 6,878,416 B2 | 4/2005 | Hall | |
| 7,224,528 B2 * | 5/2007 | Phillips et al. | 359/584 |
| 7,602,108 B2 | 10/2009 | Shelby | |
| 2008/0264558 A1 * | 10/2008 | Hayes et al. | 156/277 |

FOREIGN PATENT DOCUMENTS

WO    WO 2004030928 A1 * 4/2004

OTHER PUBLICATIONS

International Search Report and Written Opinion for PCT/CA2011/000461, Aug. 3, 2011, 7 pages.

* cited by examiner

*Primary Examiner* — Bumsuk Won
*Assistant Examiner* — Tamara Y Washington

(57) ABSTRACT

Security documents often incorporate optically variable devices to prevent or hinder counterfeiters. Disclosed herein are layered optically variable devices such as colour-shift foils that employ a piezoelectric layer, and methods for their production and use. Such devices afford new techniques for a user of a security document to check quickly and easily whether the security document is a legitimate document or a counterfeit copy by placing an electrical potential difference across the security document.

35 Claims, 11 Drawing Sheets

OPTICALLY VARIABLE DEVICES, THEIR PRODUCTION AND USE

FIELD OF THE INVENTION

The invention relates to optically variable devices, as well as methods for their production and use. Such optically variable devices may, for example, be incorporated into security documents of value, including documents which may be subject to counterfeiting, such as passports, banknotes and other articles.

BACKGROUND TO THE INVENTION

Bank notes and other security documents often incorporate optically variable devices (OVDs) such as diffraction gratings or holographic optical microstructures as security features against copy and counterfeit. The increased use of such devices has been motivated by progress in the fields of computer-based desktop publishing and scanning, which render conventional security print technologies, such as intaglio and offset printing, increasingly susceptible to counterfeit. One way to strengthen security documents against counterfeit is to combine security print with optically variable devices whose structures cannot be replicated by scanners, and which can exhibit optically variable effects such as colour changes by diffraction, movement effects, and distinct switches between images.

For example, holograms are widely used as security features in credit cards as they cannot be reproduced by photographic or photocopying techniques. To enhance the security of holograms and to prevent contact copies being made, a technique was developed for making holograms by a process of demetalization. Demetalized holograms and patches are often used in passports and ID cards to protect photographs and data. The image beneath the hologram is only visible when the document is tilted. Other OVDs include polymer or laminate microstructures in the form of foils that exhibit colour shifts in transmitted light passing through the foil and/or ambient light reflecting from the foil. Tilting the foil results in a visible colour-shift effect due for example to a laminate microstructure, or Bragg stacking within the foil. Such devices provide particularly useful surface security features in applications where the substrate to which they are applied is flexible or foldable, such as in banknotes.

Security devices, including those comprising OVDs, often take the form or shape of strips or threads. Such threads are traditionally made from a transparent film provided with a continuous reflective metal layer, vacuum deposited aluminium on polyester film being the commonest example. Banknotes incorporating such security devices have been in general circulation in many countries for many years. When such security elements are fully embedded in security paper, and the paper is subsequently printed to provide the security document (e.g. a banknote), the thread cannot be discerned readily in reflected light but is immediately apparent as a dark image when the document is viewed in transmitted light. Such threads are effective against counterfeiting by printing or photocopying, since the optically variable effect cannot be simulated accurately, for example by printing a line on the paper.

Security threads may also be incorporated into security documents in a manner such that they are conspicuous in reflected light, due to portions or the entirely of the security thread being exposed for visual inspection. For example, security threads may be woven into the principle substrate or material of the security document so that the thread is visible in repeating windows in the document, or alternatively the thread may be adhered or laminated to the principle substrate or material. When such security threads, or portions thereof, are exposed in reflected light, they may include or consist of optically variable features as previously described.

Also known in the art is the use of polymer-based films or sheets as an alternative basic substrate for the production of security documents. In some countries such films are used instead of paper-based substrates for bank note production. In comparison to bank notes manufactured using paper substrates, those made from polymer film are highly resilient to tearing, wear and abrasion. As such the bank notes have a longer useable lifespan, and thus may remain in circulation for a significant period of time. However, the use of polymer films presents new challenges with regard to incorporation of security features. For example, compared to paper, it is more difficult to embed or weave security features into polymer film bank notes. Instead, most security devices must be manufactured independently and adhered to the polymer film material. For example, colour-shifting threads and foils manufactured by vacuum deposition are expensive to manufacture and in the case of foils their application to a substrate may result in significant wastage of unwanted or unused thin film colour-shift material. In the case of threads, the expensive manufacturing process often limits the thread width that can be embedded into the security document. Also adding content to optical thin film colour-shift material can be difficult and require multiple processing steps with caustic chemicals, or foil transfer techniques which can again result in significant wastage of the expensive material. As a result, large scale implantation of OVDs, for example in bank note production, is expensive.

Thus there is a continuing need for improved security devices and features for security documents, as well as improved methods for their manufacture. In particular, the need extends to devices that are difficult to counterfeit, yet relatively inexpensive to manufacture, which are suitable for application to a range of substrate materials including both paper and polymer films.

SUMMARY OF THE INVENTION

It is an object of the invention, at least in selected embodiments, to provide an optically variable security device.

It is another object of the invention, at least in selected embodiments, to provide a method to check whether a security document is a legitimate or counterfeit security document.

Certain exemplary embodiments provide an optically variable device comprising:
  a reflector layer;
  a piezoelectric layer covering part or all of the reflector layer, said piezoelectric layer changeable from a first state to a second state upon application of, or an increase of, electrical potential difference; and
  an absorber layer covering the piezoelectric layer, where present, so that the piezoelectric layer spaces the absorber layer from the reflector layer to form an optical interference structure in at least one of said first and second states.

Other exemplary embodiments provide for a use of an optically variable device as described herein, as a security feature of a security document.

Other exemplary embodiments provide for a security document comprising:
  a core material; and
  at least one optically variable device as described herein affixed to at least one side of the core material, or at least partially embedded into the core material, such that the device is at least partly visible in reflected light from said at least one side.

Other exemplary embodiments provide for a method for producing an optically variable device, the method comprising the steps of:

providing a reflector layer;

applying a piezoelectric layer upon preselected portions of the reflector layer, the piezoelectric layer changeable between a first state and a second state upon application of, or increase of, electrical potential difference across the layer; and applying an absorber layer upon the piezoelectric layer where present thereby to complete an optical interference structure over said preselected portions of the reflector layer when the piezoelectric layer is in at least one of the first and second states;

wherein optionally the absorber layer may be applied to the piezoelectric layer before the piezoelectric layer is applied to the reflector layer.

Other exemplary embodiments provide for a method for checking whether a security document is a legitimate or counterfeit document, the security document comprising at least one optically variable device as described herein visible on at least one side thereof, the method comprising the steps of:

applying an electrical potential difference across at least one optically variable device; and observing whether the electrical potential difference causes a visible change in the appearance of the optically variable device, wherein any visible change is indicative that the security document is a legitimate document.

BRIEF DESCRIPTION OF THE DRAWINGS

FIG. 1a illustrates a top plan view of a security document incorporating an example security device.

FIG. 1b illustrates a cross-sectional view of a security document incorporating an example security device, taken along line A-A' in FIG. 1a.

FIG. 1c illustrates a cross-sectional view of a security document incorporating an example security device, taken along line A-A' in FIG. 1a, under mechanical pressure.

FIG. 2a illustrates a top plan view of a security document incorporating an example security device.

FIG. 2b illustrates a cross-sectional view of a security document incorporating an example security device, taken along line A-A' in FIG. 2a.

FIG. 2c illustrates a cross-sectional view of a security document incorporating an example security device, taken along line A-A' in FIG. 2a, under mechanical pressure.

FIG. 3a illustrates a top plan view of a security document incorporating an example security device.

FIG. 3b illustrates a cross-sectional view of a security document incorporating an example security device, taken along line A-A' in FIG. 3a.

FIG. 3c illustrates a cross-sectional view of a security document incorporating an example security device, taken along line A-A' in FIG. 3a, under mechanical pressure.

FIG. 4a illustrates a top plan view of a security document incorporating an example security device.

FIG. 4b illustrates a cross-sectional view of a security document incorporating an example security device, taken along line A-A' in FIG. 4a.

FIG. 5a illustrates a top plan view of a security document incorporating an example security device.

FIG. 5b illustrates a cross-sectional view of a security document incorporating an example security device, taken along line A-A' in FIG. 5a.

FIG. 6a illustrates a top plan view of a security document incorporating an example security device.

FIG. 6b illustrates a cross-sectional view of a security document incorporating an example security device, taken along line A-A' in FIG. 6a.

FIG. 11a (prior art) illustrates schematically expansion of a single sheet of piezoceramic upon application of an electric field having the same polarity and orientation as the original polarization field.

FIG. 11b illustrates schematically the same single sheet of piezoceramic as shown in FIG. 11a upon application of a reverse electric field to that shown in FIG. 11a.

DEFINITIONS

Figure 1:
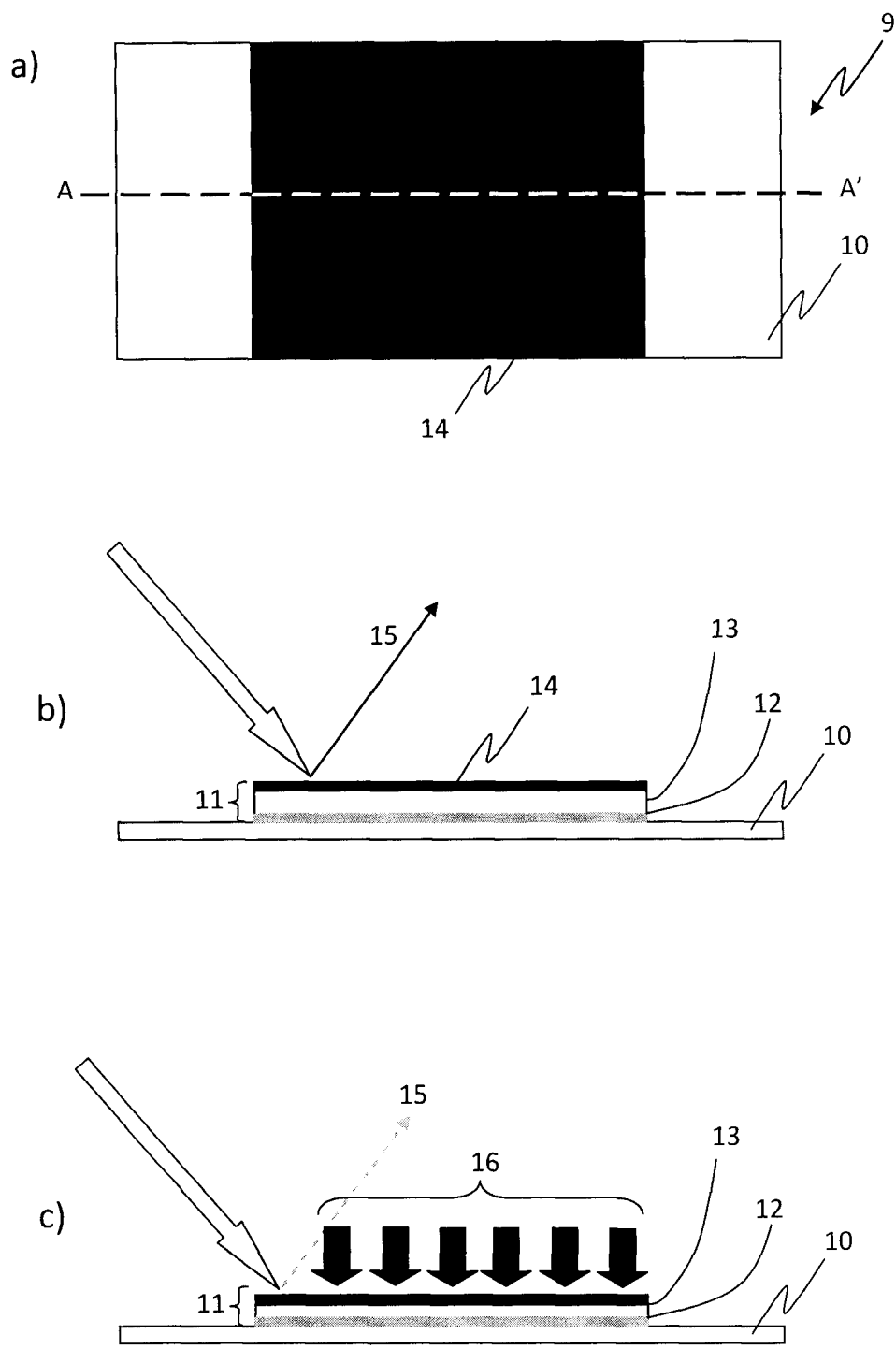

Absorber layer: refers to any layer forming part of any optically variable device of the invention, or any optical interference structure, that causes at least some (e.g. 1-99%) of light incident upon or reflected back to the layer to be transmitted through the layer, with at least a portion of the light absorbed by the layer. In other embodiments 'absorber layer' also refers to a thin metal layer which is part of a three layer Fabry-Perot reflection type interference filter and has the property of semi-transparency in the a portion of the optical spectrum for which a colour-shift effect is desired. A description of the operation of the Fabry-Perot reflectance interface filter and the role of the absorber layer in such a structure maybe found in reference (for example see Phillips, R. W. and Bleikom, "Optical Coatings for Document Security" Applied Optics, Vol. 35, No. 28, Oct. 1, 1996, pp. 529-5534.) In selected embodiments the absorber layer may be the surface layer of a security device comprising an optical interference structure. An absorber layer may comprise any material or combination of materials that exhibit the light absorption/transmission properties described, including but not limited to at least one material selected from the group consisting of: metals, metal alloys, Chromium alloys, Inconel, aluminum, or a material selected from the group consisting of chromium, nickel, palladium, titanium, vanadium, cobalt, iron, tungsten, molybdenum, niobium, ferric oxide, and combinations or alloys thereof. In selected embodiments the absorber layer may optimally permit about 50% of visible, UV or IR light incident thereupon to be transmitted through the absorber layer, with about 50% of light being absorbed by the absorber layer. In this way, more obvious colour-shift properties may be observed. For example, a layer of Inconel having a thickness of about 6 nm has been found to achieve such desired transmission/absorption and colour saturation characteristics.

Colour: refers typically to a colour observed for visible or beyond visible (e.g. IR or UV) light emanating or reflecting from an optical interference structure or security device as disclosed herein. Any change that is observed in the colour, for example resulting from a change, formation or disruption of an optical interference structure, may result either in a change in the apparent colour observed from the structure or device at a fixed angle relative to a plane of the structure or device, and/or a change in the colour shift properties of the structure or device as it is tilted relative to a user. All such changes in optical properties are encompassed by the expression "colour-shift". Core material: refers to any material used to form the main substrate, structure or sheet of a security document. The material is typically formed into a sheet or planar member, and may be composed of a substance selected from but not limited to paper, a plastic, a polymer, a resin, a fibrous material or the like, or combinations thereof. In selected embodiments the core material is of a material suitable for application thereto, either directly or indirectly, of a security device of the types disclosed herein. The security device, or elements thereof, may be applied or attached to the core material in any manner including the use of adhesive materials or layers, such as glues, or by overlaying an adhesive substance, film, varnish or other material over the top of the security device or components thereof. The core material may be smooth or textured, fibrous or of uniform consistency. Moreover, the core material may be rigid or substantially rigid, or flexible, bendable or foldable as require by the security document. The core material may be treated or modified in any way in the production of the final security document. For example, the core material may be printed on, coated, impregnated, or otherwise modified in any other way.

First state: refers to any condition, state, thickness, shape or configuration of a piezoelectric layer, or an optical interference structure comprising a piezoelectric layer, absent any electrical potential difference across the layer or structure, or under conditions of reduced electrical potential difference across the layer or structure relative to an electrical potential difference suitable to cause a second state as defined herein.

Optical interference structure: refers to any structure that achieves interference of visible light incident upon the structure, such that light observed to be emanating from the structure appears different to the light incident upon the structure. For example, white light incident upon and reflected back from an optically variable foil may appear coloured, and the colour may change if the foil is tilted relative to the observer. An optical interference structure as described herein may also take the form of a planar optionally flexible device intended to form an independent layer or a layer on a substrate, or may take the form of a Flake or component of a Flake in accordance with such known devices in the art. Examples of optical intereference structures include, but are not limited to, those disclosed in Goodell et al., "Optical constants of Inconel alloy films", Journal of the Optical Society of America, 63(2), pages 185-188 and references cited therein, as well as Optical Document Security, Third Edition, Rudolf L. Van Renesse, Artech House 2005, Chapter 7 and references cited therein. Selected optical interference structures may comprise a multilayer structure or Fabry-Perot structure or other structure.

Polymer core material: refers to any polymer or polymer-like substance suitable to form a core material in the form of a sheet-like configuration to be formed or cut into a size suitable for use in security documents. The polymer core material may be a substantially uniform sheet of polymer material, or may take the form of a laminate structure with layers of polymer film adhered together for structural integrity, such as disclosed for example in international patent publication WO83/00659 published Mar. 3, 1983, which is incorporated herein by reference. A polymer core material may also comprise a material that includes a polymer in combination with other materials such as plastic or paper to form a hybrid core material.

Piezoelectric layer: refers to any layer formed from any material that: (1) can be change shape, thickness, configuration or form, either permanently or temporarily, under conditions of an electrical potential difference or an increased electrical potential difference by virtue of the piezoelectric properties of the materials of the layer. For example, the thickness of the layer may be changeable between a first state absent electrical potential difference, (or under less electrical potential difference) and a second state under increased electrical potential difference, and (2) has suitable optical properties such that when the layer separates a reflector layer and an absorber layer as described herein an optical interference structure is formed in at least one of the said first and second states. Preferably the piezoelectric layer is reversibly changeable such that the layer can be transitioned between first and second states multiple times upon repeated application and removal of the electrical potential difference, or repeated increase and decrease of electrical potential difference. The degree shape or thickness change of the piezoelectric layer (for example the capacity of the layer to be reduced or increased in thickness upon application or increase of electrical potential difference) may be established according to the material used to form the layer. For example, different polymers or crystals may be less or more inclined to change shape or thickness compared to other materials under the same degree of electrical potential difference. Examples of materials suitable for use in the formation of piezoelectric layers include but are not limited to ferroelectric and pyroelectric materials such as poly(vinylidene fluoride) (PVDF) and its copolymer with trifluoroethylene P(VDFTrFE) (reference High electrostrictive). The piezoelectric layer may be made of materials in polyvinylidene difluoride (PVDF) or PVDF derivatives. In one example, the piezoelectric layer may be made of poly (vinylidene fluoride-trifluoroethylene) (P(VDF-TrFE)) or poly(vinylidene fluoride/tetrafluoroetbylene) (P(VDF-TeFE)). In another example, the piezoelectric layer may be made of a blend of a material in PVDF or PVDF derivatives and at least one of lead zirconate titanate (PZT) fibers or particles, polymethylmethacrylate (PMMA), or poly (vinyl chloride) (PVC).

Figure 11:
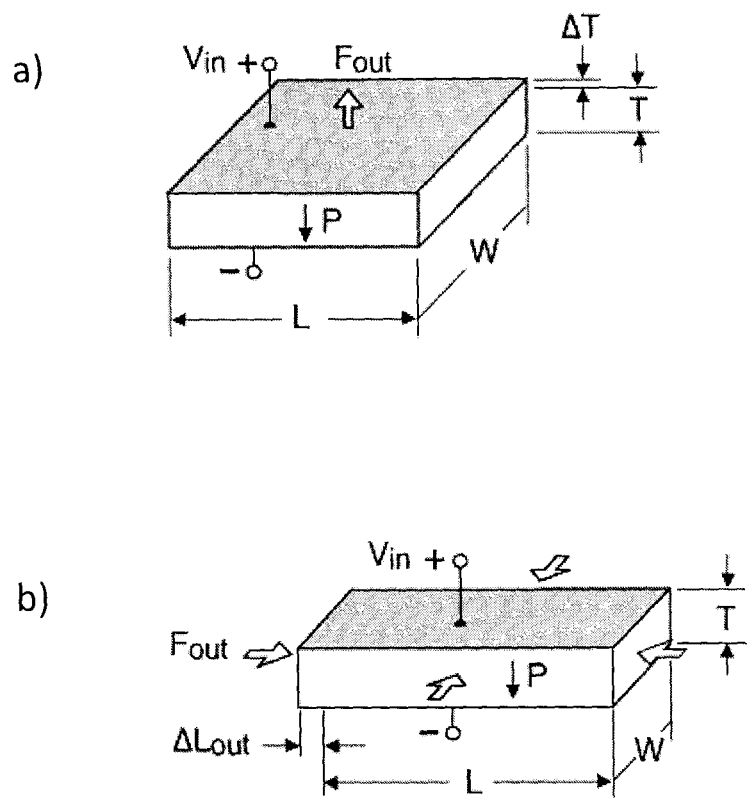

Inorganic materials that can deposited by vacuum deposition or sol gel process including lead zirconate titanate (PZT) and barium titanate, and zinc oxide. Further examples of materials suitable to used as a component material for the piezoelectric layer include, but are not limited to, those disclosed in Chu et al. (2006) Science, Vol. 313, pages 334-336, and Bauer et al. Dielectrics and Electrical Insulation, IEEE Transactions Publication Date: October 2006 Volume: 13 Issue: 5, pages: 1149-1154, both of which are incorporated herein by reference. Furthermore, a piezoelectric layer may optionally comprise or consist of an adhesive material such as but not limited to: acrylated urethanes, methacrylate esters, mercapto-esters and UV curable materials. A piezoelectric layer may be applied under any conditions and in any way. In selected embodiments the layer is applied by printing such as by Gravure printing under atmospheric conditions. Moreover, the piezoelectric properties of a piezoelectric layer may be imparted to the layer either before, during or after its application or formation upon a reflector or absorber layer, in accordance with the teachings herein. In one example of a piezoelectric layer, when an electric field having the same polarity and orientation as the original polarization field is placed across the thickness of a single sheet of piezoceramic, the piece expands in the thickness or "longitudinal" direction (i.e. along the axis of polarization) as shown in FIG. 11a. At the same time, the sheet contracts in the "transverse" direction (i.e. perpendicular to the axis of polarization) as shown in FIG. 11b. When the field is reversed, the motions are reversed. Sheets and plates utilize this effect. The motion of a sheet in the thickness direction may at least in some embodiments be extremely small (on the order of tens of nanometers). For example, in accordance with the security devices and documents disclosed herein a thickness change in the order of tens of nm may be suitable for operation or optical change of the device since it will represent a 5-8% change in thickness for the spacer layer. On the other hand, since the length dimension is often substantially greater than the thickness dimension, the transverse motion is generally larger (on the order of microns to tens of microns). The transverse motion of a sheet laminated to the surface of a structure can induce it to stretch or bend, a feature often exploited in structural control systems.

Second state: refers to a state, shape or thickness of a piezoelectric layer upon application thereto of an electrical potential difference, or in the presence of an increased electrical potential difference, relative to a first state, to change, alter, increase, or decrease the state, shape, thickness or configuration of the layer in at least a portion thereof relative to a first state. In selected embodiments a second state is a state that is different to a first state in which the electrical potential difference is reduced or absent. However, a second state may be a single state in response to a fixed degree of electrical potential difference, or may pertain to a range of degrees of states, shapes or thicknesses in response to a range of degrees of electrical potential difference. Moreover, the amount of electrical potential difference required for a piezoelectric layer to adopt a second state may vary according to the piezoelectric properties of the layer. Optionally, the layer may form an optical interference structure in said first state or alternatively may form an optical interference structure following transition from a first state to a second state, or alternatively may form alternative optical interference structures according to whether the layer is in a first or second state.

Security document: refers to any document, item or article of manufacture of any importance or value, which might be subject to counterfeit copying. In selected embodiments, a security document may include features or devices intended to show that the document, item or article is a genuine and legitimate version, and not a counterfeit copy of such a document, item or article. For example, such security documents may include security features such as those disclosed herein. Such security documents may include, but are not limited to, identification documents such as passports, citizenship or residency documents, drivers' licenses, bank notes, cheques, credit cards, bank cards, and other documents, as well as labeling or other security features, for items of monetary value such as designer clothing, accessories, or any other branded products where it is desired to indicate or demonstrate the authenticity or legitimacy of the product compared to a counterfeit copy. Such security features may be permanently or removably incorporated therein depending upon the nature of the document, item or article, and the intended end user.

Security device or feature: refers to any device or feature that may be added to a security document for the purposes of making that security document more difficult to copy or replicate.

Reflector layer: refers to any layer forming part of any optically variable device of the invention, or any optical interference structure, that causes at least some (e.g. 1-100%) of light incident thereupon to be reflected. In selected embodiments the reflector layer may be in contact with a core material or substrate of a security document, to which a security device comprising the optically variable device is being applied. A reflector layer may comprise any reflective or partially reflective material including, but not limited to, at least one material selected from: a metal, a metal alloy, aluminum, chromium, nickel, Inconel silver, and gold.

Reflected light: refers to light incident upon a surface and subsequently bounced by that surface such that the reflected light is visible to the eye. The degree of light reflection may vary according to the surface, and the degree of light that is not reflected by the surface because it is scattered by, diffracted by, or transmitted through the surface and the material of the substrate.

Security thread: refers to any elongate strip or thread applied directly or indirectly to, or incorporated into, a core material of a security document for the purposes of providing a security device or feature to the document, or for the purposes of providing a component of a security device or feature for the document. Security threads typically include a structure or materials suitable to make the security thread conspicuous in transmitted and/or reflected light. For example, a security thread may include a metal or metalized layer to make the security thread conspicuous in transmitted light. Alternatively, for example, a security thread may include an optically variable feature or device best observed in transmitted or reflected light. Traditionally, security threads are incorporated for example into bank notes comprising a paper core material or substrate, and the thread may be concealed from view in reflective light by the core material, or alternatively the thread may be partially visible as it emerges in windows in the core material, or by virtue of its threading into the core material. In accordance with the teachings herein, where the core material is a polymer core material, the security thread may also take the form of an elongate strip adhered to the polymer core material (or an intermediate layer), or may be laminated between the polymer core material and one or more other layers.

Transmitted light: refers to light that is incident upon a surface, layer or multiple layers, of which a portion of the light is able to pass through and/or interact in some way with the surface, layer or layers by transmission. Light may be transmitted through a layer or layers by virtue of the layer or layers not being entirely opaque, but instead permitting at least a portion (e.g. 0-99%) of the incident light to be transmitted through the layer or layers in view of the layer or layers exhibiting at least some degree of translucency.

Window: refers to a region or portion of a security device in which a component of a security device, such as a security thread, is exposed for visual inspection, because there is little or no translucent or opaque material to obscure the view of the exposed portions. A window may be present even if there are transparent or translucent layers, for example of film, to cover the security device or components thereof, because the exposed portions of the security thread are still visible, at least in part, through the film. In further selected embodiments as disclosed herein 'window' refers to one or more portions of a security device as disclosed herein in which a masking layer does not extend across all of the surface of a security thread, such that portions of the security thread are exposed for visual inspection in reflective light.

DETAILED DESCRIPTION OF THE INVENTION

Herein described are optically variable devices and optical interference structures that, at least in selected embodiments, are useful as security features for security documents. The invention encompasses the structures themselves, as well as methods for their manufacture and use. To date, thin film colour-shifting optically variable foils have had limited use in the mass-production of security documents, in part due to their cost and speed of manufacture. The optically variable devices described herein help to address the limitations of the prior art, and provide novel ways to check the legitimacy of security documents comprising them.

Optical interference structures are well known for their colour-shift properties. These structures are capable of filtering the visible spectrum of light into one or more bands of relatively high reflectance bounded by bands of relatively low reflectance. In this way, optical interference structures exhibit a coloured appearance when illuminated with white light. Moreover, such structures may exhibit a colour-shift as they are tilted relative to the eye.

Some optical interference structures are capable of producing interference colours by employing multiple transparent or semitransparent layers to achieve the filtering effect. For example, some structures may comprise thin layers of dielectric material of alternating high and low refractive index, or alternating metal and dielectric layers, wherein the metal layers are semitransparent except for an opaque or reflective base layer. Other optical interference structures involve fewer layers but still achieve useful colour-shift characteristics. For example, Fabry-Perot optical cavities may comprise just a single reflector layer of a reflective material together with a single absorber layer of a translucent absorber material, wherein the reflector and absorber layers are spaced by a spacer layer having a high degree of optical transparency in the visible portion of the light spectrum. The resulting Fabry-Perot optical cavity exhibits colour-shifts dependent upon the optical properties of the reflector and absorber layers, as well as the thickness of the spacer layer between them.

The inventor has endeavoured to develop novel optical interference structures that are useful in the production of security documents. In particular, the inventor has endeavoured to develop security devices that exhibit colour-shift properties that can be altered or selectively activated or deactivated according to the user manipulation of the device for example with the assistance of a screening tool or device. To this end the security devices disclosed herein include at least one layer of piezoelectric material as a spacer layer, the shape, configuration or thickness of which can be changed upon application of an electrical potential difference. In this way, the device can adopt alternative optical properties according to whether the piezoelectric layer is in a first state under conditions of reduced electrical potential difference across the layer (or absent any electrical potential difference), or in a second state with an increased electrical potential difference across the layer (or in the presence of an electrical potential difference).

Certain exemplary embodiments will now be described with reference to the accompanying figures. For simplicity, these will be described in terms of a first state absent any electrical potential difference, and a second state in the presence of an electrical potential difference. However, no embodiments are limited in this regard and any transition between first and second states may be achievable by altering the degree of electrical potential difference being applied to the device (rather than applying and removing the electrical potential difference). It should also be noted that the accompanying figures illustrate exemplary embodiments in a schematic fashion: the thicknesses of the layers shown relative to one another, or the relative thicknesses of the piezoelectric layers in a first or second state, are not shown to scale but exaggerated from typical working embodiments to facilitate an understanding of certain aspects of the invention.

Furthermore, although selected Figures illustrate a decrease in thickness of a piezoelectric layer in the presence of (or an increase of) potential difference, the invention is not limited in this regard. Selected further embodiments encompass security devices in which transition from a first to a second state by applying a potential difference causes an increase (rather than a decrease) in the thickness of the piezoelectric layer present, which in turn results in an alternative change in the optical properties of the security device. Furthermore, whilst the embodiments described below sometimes indicate a complete gain or loss of optical properties, for example due to a formation or disruption of an optical interference structure, the invention encompasses any security device or document for which any change in optical properties is observed, or any change in observable colour shift properties, for any increase or decrease in potential difference across the device or document. Turning first to FIG. 1 there is shown in FIG. 1a a top-plan view of a security document shown generally at 9, and in FIG. 1b there is shown a cross-section through the same security document along lines A-A' in FIG. 1a, with an optically variable device in contact with the core substrate of the document, either directly or via an adhesive layer.

In FIG. 1 the core substrate 10 may comprise any suitable material or combination of materials, but in this example comprises a polymer such as PET having a thickness of about 12 μm. Attached to the PET is a security device shown generally at 11, comprising three distinct layers. A reflector layer 12 is in direct contact with the PET 10, and comprises any material with reflective properties for visible light incident upon the layer. In the example shown in FIG. 1 the reflective layer comprises a vacuum-deposited layer of Aluminum having a thickness of about 200 nm.

In contact with the reflector layer 12 is a piezoelectric layer 13 covering the reflector layer 12. In the embodiment shown in FIG. 1 an absorber layer 14 adhered to the piezoelectric layer and comprises a metal alloy such as Inconel™ having a thickness of about 6 nm. The embodiment illustrated in FIG. 1 shows how the absorber layer 14 is spaced from the reflector layer 12 by piezoelectric layer 13.

FIG. 1b illustrates the device 11 upon substrate 10 in a first state absent any electrical potential difference upon the device. In the first state the thickness of the piezoelectric layer 13 as shown in the embodiment is about 400 nm to achieve a gold-green colour shift shown schematically by arrows 15. In contrast, FIG. 1c illustrates the same device 11 upon the same substrate 10, but with an electrical potential difference of approximately 100-1000 v applied across the device. This causes the piezoelectric layer to be reduced in thickness relative to FIG. 1b by adopting a second state, thus resulting in an overall reduction in thickness of the device as denoted by arrows 16. In the second state the thickness of the piezoelectric layer 13 is less than in the first state shown in FIG. 1b. The reduction in thickness is sufficient to change or disrupt the green-gold optical interference structure of the device such that the colour shift 15 shown in FIG. 1b is no longer observable by a user for the device. Whilst the embodiment illustrated in FIG. 1 indicates a reduction in thickness of the piezoelectric layer upon application of a potential difference, the invention encompasses embodiments where the piezoelectric layer instead increases in thickness upon exposure of the device to an electrical potential difference.

Figure 2:
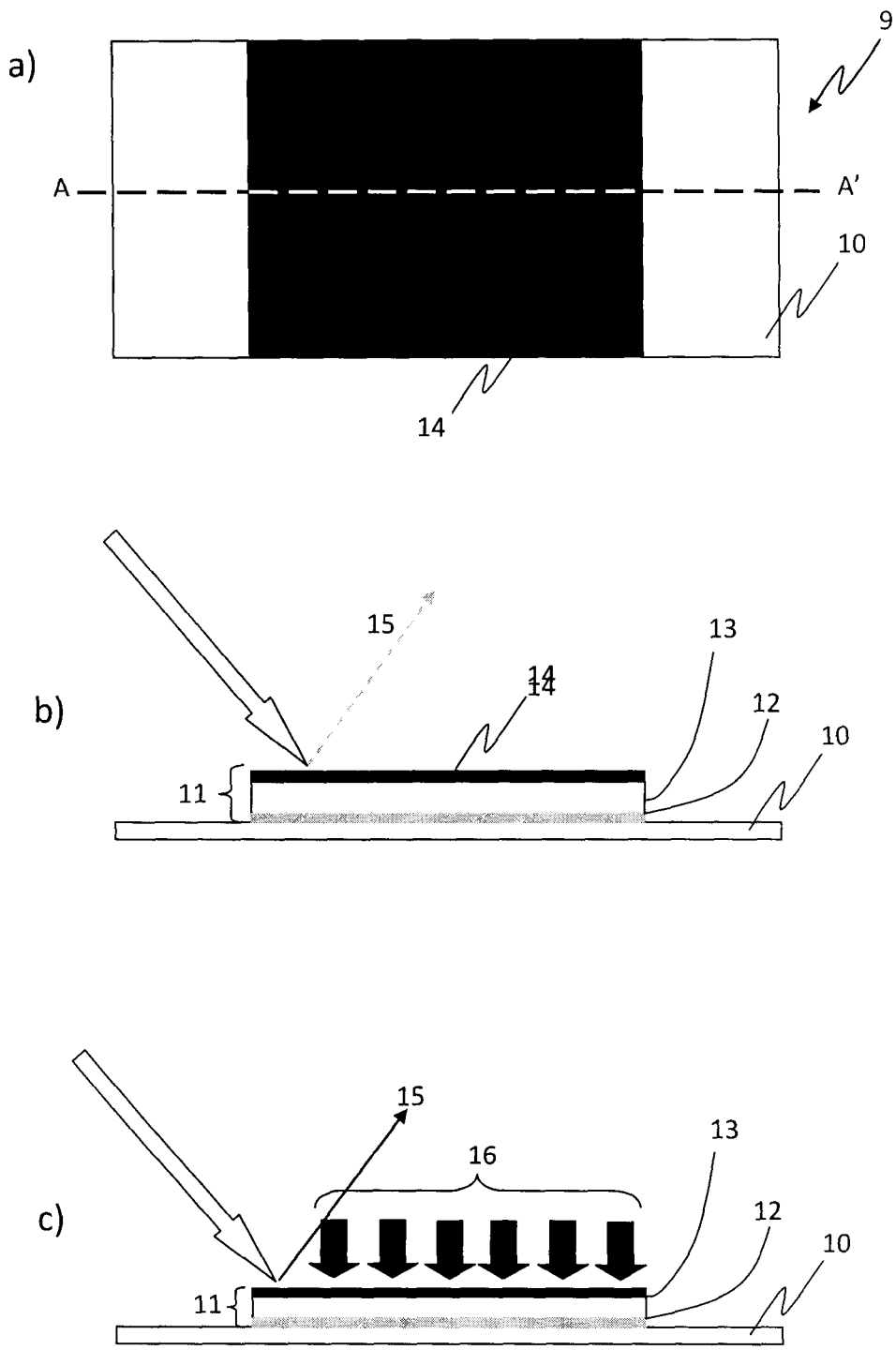

FIG. 2 illustrates an alternative embodiment similar to FIG. 1, but in which an optical interference structure is formed only upon application of a electrical potential difference to cause the device to change from the first state to the second state. FIGS. 2a, 2b, and 2c illustrate a device similar in appearance to that shown in FIGS. 1a, 1b and 1c, except that in a first state absent any electrical potential difference the device does not provide a green-gold colour shift due to an absence of a suitable or functional optical interference structure. This is due, at least in this example, to the device including a piezoelectric layer 13 having a thickness of greater than 400 nm; too thick for a useful and observable green-gold colour shift. However, as shown in FIG. 2c, application of electrical potential difference causes a reduction in the thickness of the piezoelectric layer (denoted by arrows 16) such that it has a thickness of 400 nm in the second state. In this way, a functional optical interference structure is formed in the second state, giving rise to an observable green-gold colour shift 15 as shown in FIG. 2c.

Figure 3:
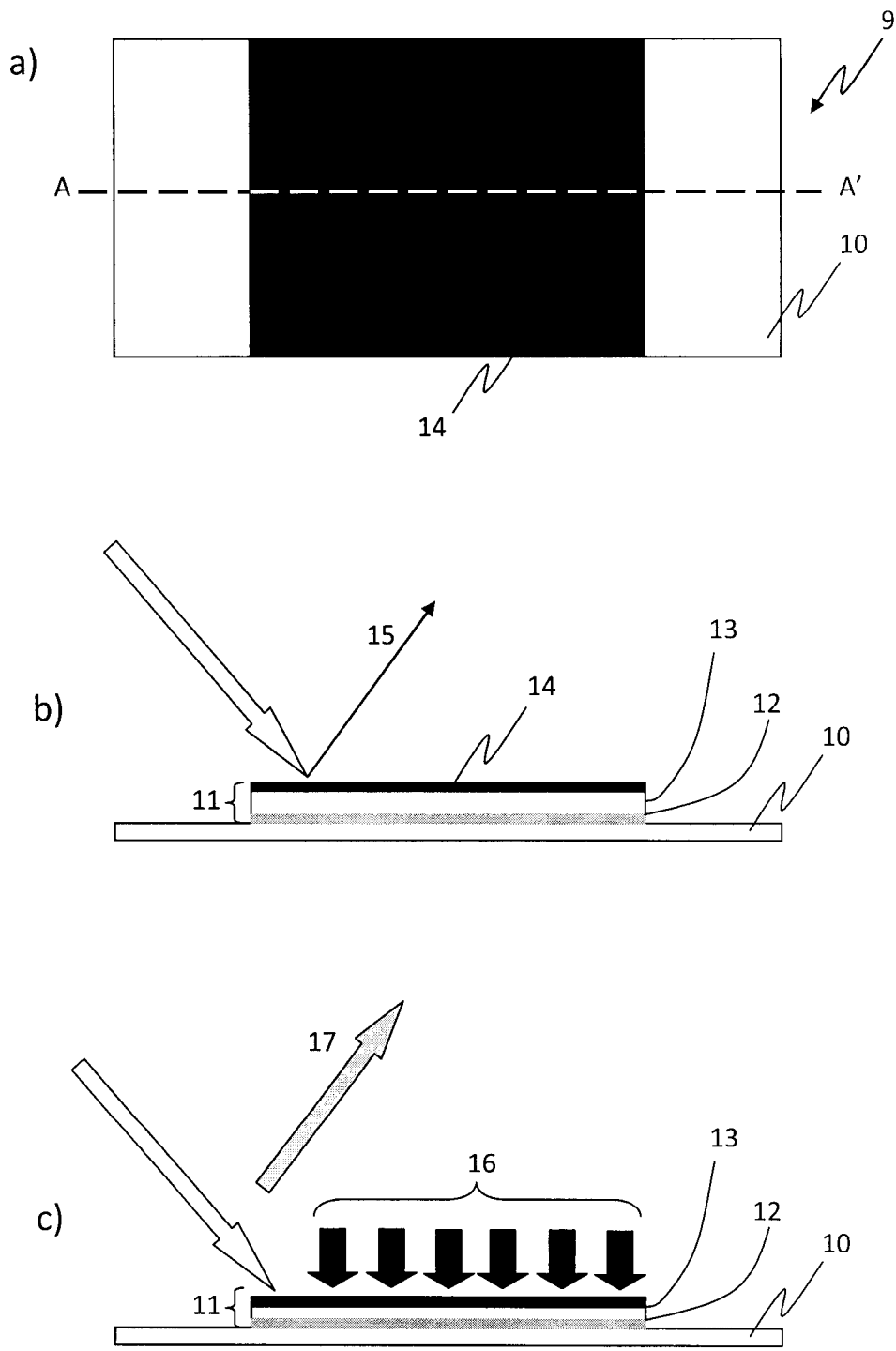

FIG. 3 illustrates an alternative embodiment to those shown in FIGS. 1 and 2, wherein a colour shift is observable in both a first state absent any electrical potential difference (see FIG. 3b) and also in a second state in the presence of electrical potential difference (the reduction in thickness of the device is denoted by arrows 16 in FIG. 3c). However, the colour shift in the first state is a green-gold colour shift provided by virtue of the piezoelectric layer 13 having a thickness of 400 nm in a first state (FIG. 3b) whereas use of a less deformable material for the piezoelectric layer, or use of less electrical potential difference, causes a small reduction in the thickness of the piezoelectric layer to for example 300-375 nm in a second state shown in FIG. 3c, such that a colour shift is still observable but the colour shift denoted by arrows 17 in FIG. 3c is other than a green-gold colour shift, such as a blue-magenta colour shift. Thus, transition of the device from a first state to a second state (or vice verse) results in a change in the observable colour-shift properties for the device. Again, as stated above, the invention is not limited to embodiments in which a decrease in the thickness of the piezoelectric layer is observed upon application of an electrical potential difference. Further embodiments are encompassed by the invention in which a shift of optical properties is caused by an increase in the thickness of a piezoelectric layer when in a presence of an electrical potential difference.

Figure 4:
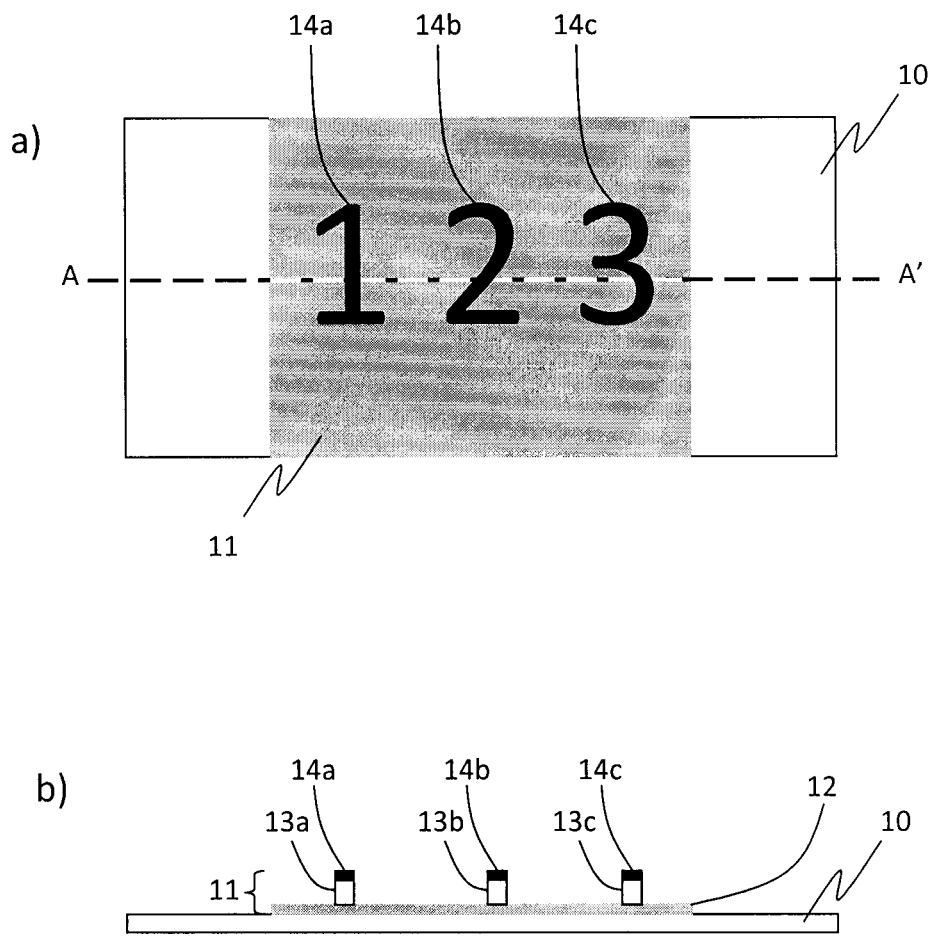
Figure 5:
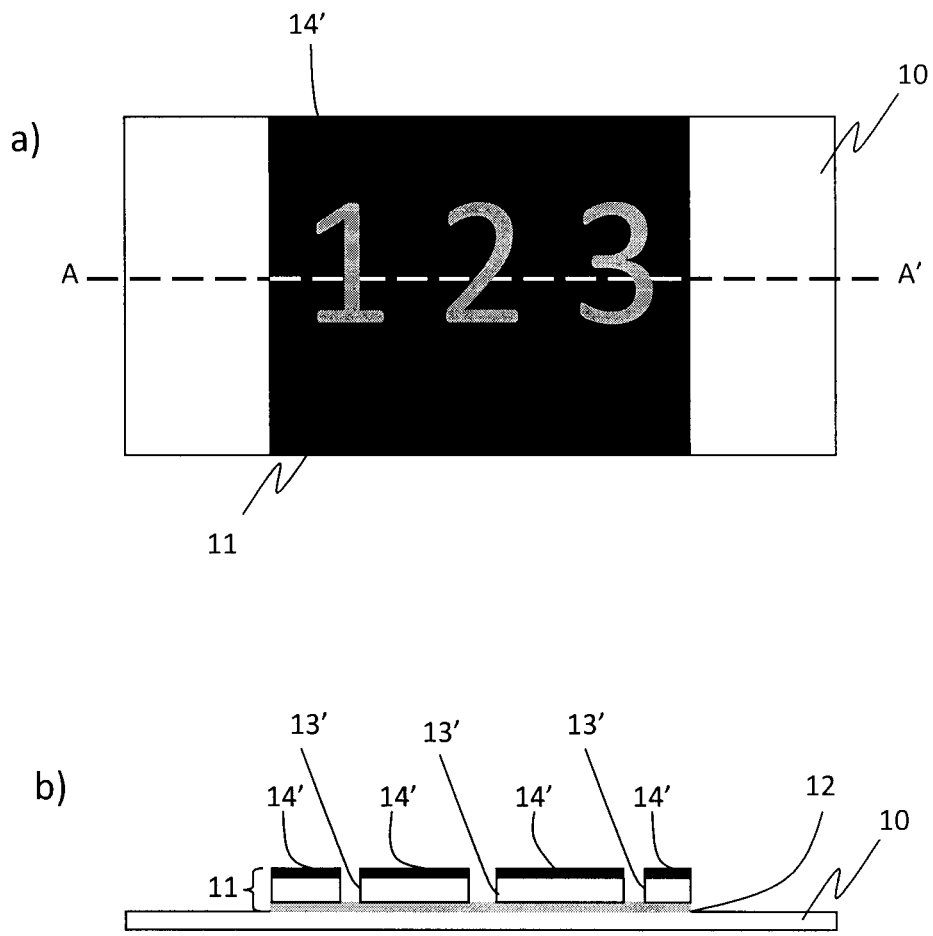
Figure 6:
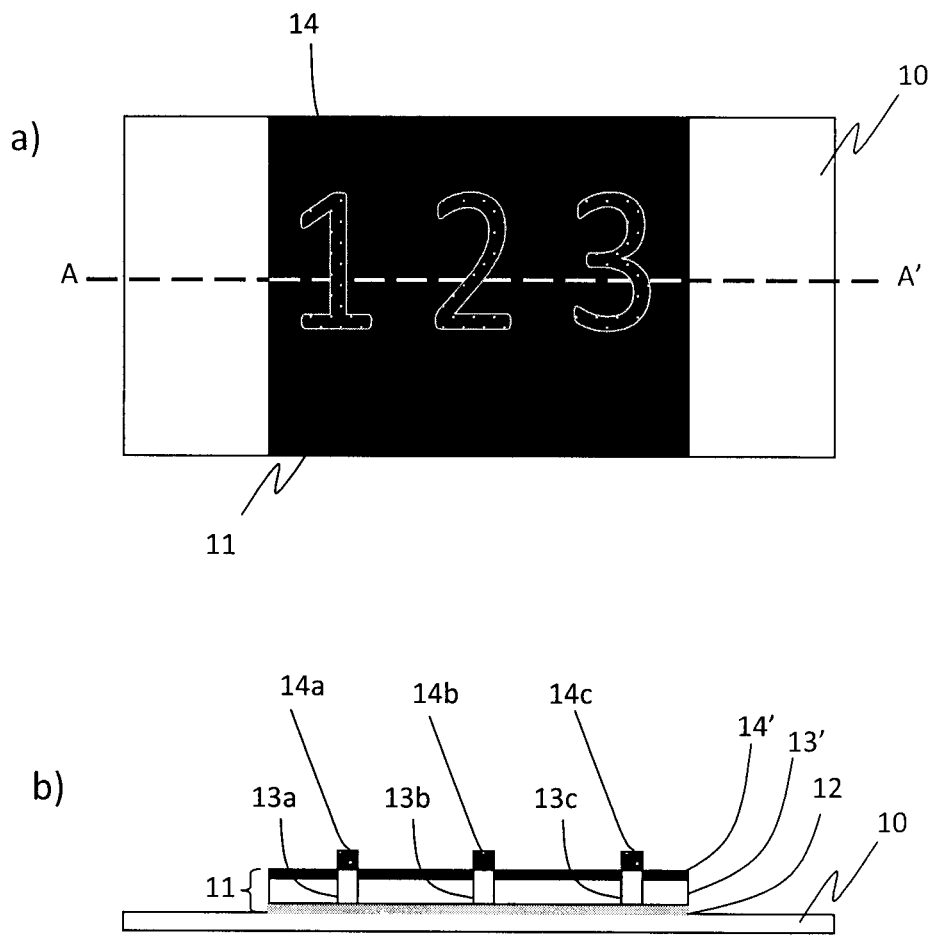

FIGS. 4 to 6 illustrate how content may be included in the security devices and optical interference structures disclosed herein. For example, in FIG. 4 there is shown a device 11 again comprising layers 12, 13, and 14 as for FIGS. 1 to 3, except that the optical cavity structure has only been completed in certain areas by piezoelectric layer 13a, 13b, 13b and absorber layer (e.g. Inconel) 14a, 14b, 14c. In contrast, FIG. 5 provides in effect a negative of the embodiment illustrated in FIG. 4, with piezoelectric layer 13' and absorber layer 14'. Such patterns may be achieved by the use of a piezoelectric layer material that is amenable to being printed upon reflector layer 12 such as by Gravure printing, or alternatively other techniques known in the art may be employed to produce such patterns, such as but not limited to vacuum deposition and wet etching techniques. If the piezoelectric layer is adhesive or tacky, then the layer may be contacted with absorber material, for example located via a release layer on a web, such that the absorber material adheres to the piezoelectric layer and is released from the web, thus to complete the optical interference structure. Regardless, the piezoelectric layer may have any deformation properties and thickness as required to achieve as desired loss, gain or change or colour shift properties as the device transitions between a first and second state, as described with reference to FIGS. 1 to 3.

FIG. 6 illustrates an alternative security device shown generally at 11 including content in the form of numbers 1, 2 and 3 as shown in FIG. 6a. FIG. 6b illustrates a cross-section through the device along line A-A' in FIG. 6a. The portions of the optical interference structure that include numbers 1, 2, and 3 comprise a piezoelectric layer 13a, 13b, 13c that is thicker than the piezoelectric layer 13' of the remainder of the device. As a result, whether in a first or second state, the numbers 1, 2 and 3 are visible by virtue of the alternative optical properties of the device provided by thicker piezoelectric layer 13a, 13b, 13c. For example, in a first state the portion of the device comprising areas other than those forming numbers 1, 2, and 3 may comprise a piezoelectric layer 13' having a thickness of 400 nm to give rise to a green-gold colour shift, whereas in the second state the portions comprising number 1, 2, and 3 may have a piezoelectric layer with a thickness of 450-650 nm: too thick to provide a functional optical interference structure or a green-gold colour shift.

Alternatively, upon application of electrical potential difference all piezoelectric layers present may be reduced in thickness. In selected embodiments this may result in those areas around numbers 1, 2, and 3 having a piezoelectric layer too thin to provide a functional optical interference structure or a green-gold colour shift, whereas the piezoelectric layer of the number 1, 2, and 3 may be reduced in thickness to 400 nm suitable to provide a gold-green colour-shift. Any variants to alter the optical properties of the various regions of the device in the first and/or second state are encompassed by the invention.

In other embodiments only selected portions of the device may include a piezoelectric layer, whereas other portions may comprise any 'regular' non-piezoelectric spacer layer (e.g. comprising an adhesive spacer layer or silica). In such embodiments, the portions that include a regular spacer layer and the portions that include a piezoelectric layer may optionally have spacer layers having the same or near identical thicknesses either when the portions comprising a piezoelectric layer adopt a first or second state. In this way the content may only become visible to a user upon application or removal of an electrical potential difference across the device, to transition select portions of the device to an alternative state (i.e. first or second state) suitable to provide a difference in the relative spacer layer thicknesses of the regions comprising the piezoelectric layer compared to the regions comprising the regular non-piezoelectric layer. For example with reference to FIG. 6a, the device may comprise numbers 1, 2 and 3 each having a regular spacer layer, surrounded by other regions having a piezoelectric layer with the same thickness as the regular non-piezoelectric layer only when in one of the first state. Application of electrical potential difference to the device may alter the thickness only of the piezoelectric layer present in the regions surrounding numbers 1, 2 and 3 with a resulting optical difference (gain, loss or change in colour-shift properties) compared to the regions comprising numbers 1, 2 and 3. If the electrical potential difference causes the regions surrounding numbers 1, 2 and 3 to lose reflectance properties compared to the numbers then this may result in the numbers 1, 2 and 3 becoming more obvious so that they 'appear' to a user upon visual inspection of the device when the electrical potential difference is applied. In alternative embodiments, the numbers 1, 2 and 3 may become visible to a user only when the regions surrounding the numbers are in a second state, due to a different thickness of the piezoelectric layer in the regions surrounding the numbers compared to the regions comprising the numbers in the first state absent an electrical potential difference, so that the numbers may be caused to 'disappear' when a user applies an electrical potential difference to the device to bring the regions comprising the piezoelectric layer into a second second, such that the thickness of the piezoelectric layer is then comparable to the thickness of the regular non-piezoelectric layer. Of course, it will be appreciated that further variants of such embodiments may be used, including use of a piezoelectric layer in the regions of the device forming the numbers, with a regular non-piezoelectric layer in the other regions of the device.

In accordance with selected embodiments, security devices comprising a piezoelectric layer having a non-uniform thickness may be produced. For example a single Gravure printing step may be employed using a template with varying thicknesses of piezoelectric material, or by multiple rounds of Gravure printing of piezoelectric layers, either with a single or multiple rounds of absorber layer application. The resulting devices may comprise a piezoelectric layer or layers giving rise to different thickness of piezoelectric spacer material, thereby to produce different optical interference structures in different regions of the device. Any means to generate any form of security device or optical interference structure, with any type of content, is included within the scope of the invention, providing the device or structure includes at least portion comprising a piezoelectric layer giving rise to a change in colour shift properties upon application of, or an increase in, electrical potential difference across the device.

Optionally, each piezoelectric layer may comprise an alternative refractive index caused not only by a thickness of each layer, but optionally by the presence of other components in the layer, such as but not limited to nanoparticles etc. This applies regardless of whether the device pertains to a multilayer stack, a Fabry-Perot structure, or other optical interference structure. Moreover, the optical properties of a piezoelectric layer, such as refractive index, can be adjusted as required by altering the chemical composition of the piezoelectric layer. The moieties composing the piezoelectric layer can be altered or high refractive index nanoparticles may optionally be added to the piezoelectric material to alter the refractive index and other properties of the piezoelectric layer. High index nanoparticles include but are not limited to zirconium dioxide ($ZrO_2$), titantium dioxide ($TiO_2$), hafinium oxide (HfO) and niobium pentoxide $Nb_2O_5$).

UV fluorescent dyes and pigments can also be incorporated into the piezoelectric layer such that when the layer is exposed to a UV light source of appropriate wavelength the lamp's spectral output overlaps with the optical absorption profile of the fluorescent dye. Common document security UV lamps have outputs with peak emissions at 365 nm. Fluorescent dyes and pigments may be selected that can be dispersed or dissolved in the piezoelectric layer. The completed Fabry-Perot cavity colour-shift feature may thus exhibit an angle dependant colour-shift in the observed fluorescent emission depending upon the optical properties of the cavity and fluorescent emission spectrum of dye(s), pigment(s) or combinations of fluorescent materials dispersed or dissolved in the piezoelectric layer. In other embodiments emission intensity of the fluorescent emitter in the spacer cavity may vary with a change in viewing angle such that little or no colour-shift is observed.

Optionally the devices disclosed herein comprise a reflector layer comprising a metallic layer, preferably selected from a metal, a metal alloy, aluminum, chromium, nickel, Inconel, silver, and gold. Optionally the reflector layer reflects from 1-100% of light incident thereupon.

Optionally the devices disclosed herein comprise a piezoelectric layer comprising at least one adhesive material selected from acrylated urethanes, methacrylate esters, mercapto-esters and a UV curable adhesives.

Optionally the devices disclosed herein comprise an absorber layer comprising at least one material selected from the group consisting of Inconel, chromium, aluminum, silver and nickel. Optionally the absorber layer permits transmission therethrough of from 1-99% of light incident thereupon.

The optical interference structures and corresponding security devices disclosed herein may comprise at least one piezoelectric layer that can be permanently or temporarily changed to produce an observable change in the optical properties of the device. Preferably, the change can be repeated on several, or even many occasions by virtue of the capacity of the piezoelectric material to temporarily and repeatedly change shape upon repeated application of an electrical potential difference. For example, the security devices may be associated with an electrical potential difference generated by an alternating polarity in an electric field such that the piezoelectric layer oscillates rapidly between first and second states, with notable colour change observations in the device. This in turn requires the piezoelectric layer to comprise a material that can be repeatedly transitioned or cycled between first and second states. The invention encompasses the use of any piezoelectric material that can repeatedly transition between first and second states. This would allow a user or scanning tool to repeatedly check the legitimacy of a document.

Further exemplary embodiments encompass a use of any optically variable device or optical interference structure as herein described, as a security feature of a security document. Further exemplary embodiments provide for a security document comprising:
  a core material; and
  at least one optically variable device or optical interference structure as herein described, affixed to at least one side of the core material, or at least partially embedded into the core material, such that the device is at least partly visible in reflected light from said at least one side. The core material may comprise any material suitable for the production of a security document, but in selected embodiments may comprise at least one material selected from the group consisting of: paper, polymer, and plastic, and combinations or hybrids thereof thereof.

The optically variable device of the invention may be incorporated onto or into the core material of the security document via any appropriate means, and may take any form or shape suitable for the document. For example, the device may take the form of a security thread either laminated or adhered into position upon the core material or the security document, or woven into the core material in a manner well known in the art. The device may be entirely visible on the security document, or may be only partially visible through 'windows' formed either by the threading of the device through the core material or the security document, or by masking of select portions of the device by way of a masking material.

Figure 7:
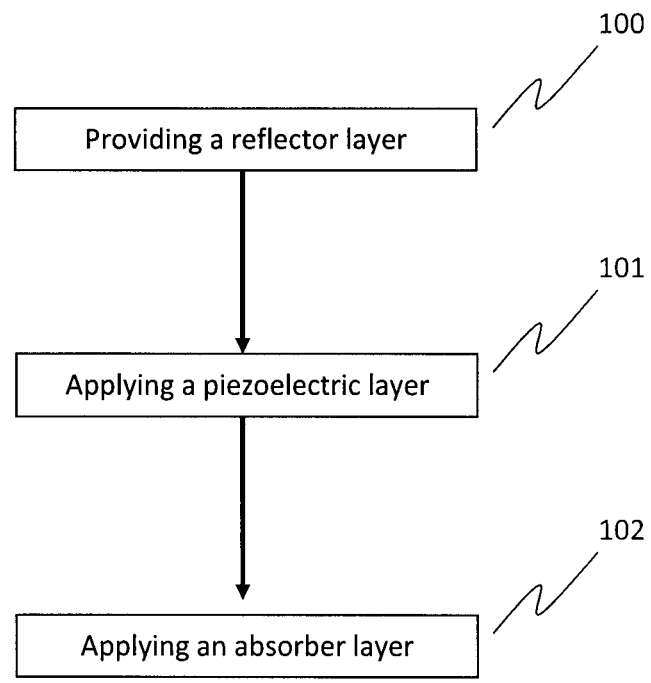
FIG. 7 illustrates a method for producing an optically variable device.

Further exemplary embodiments relating to FIG. 7 provide for a method for producing an optically variable device, the method comprising:
  in step 100 providing a reflector layer;
  in step 101 applying a piezoelectric layer upon preselected portions of the reflector layer, wherein said piezoelectric layer optionally comprises an adhesive material; and
  in step 102 applying to the piezoelectric layer an absorber layer thereby to complete an optical interference structure over said preselected portions of the reflector layer. Optionally, the absorber material may be coated on a web, such that contacting the piezoelectric layer with the absorber material on the web causes release of the absorber material from the web and adhesion of the absorber material to the piezoelectric layer where present. For example, to facilitate this transfer of the absorber material the piezoelectric layer may, at least in some embodiments, contain an adhesive component, or be temporarily heated above its Tg to make the piezoelectric layer tacky and more adhesive.

Optionally step 101 of printing comprises Gravure printing.

Optionally step 102 of contacting comprises pressing the coated web and piezoelectric layer together using a roller.

Optionally in step 101 the piezoelectric layer comprises a UV curable material, the method further comprising the step of:

curing the piezoelectric layer with UV radiation.

Optionally, in step 102 the piezoelectric layer is printed with a non-uniform thickness in a second state and/or in a first state, thereby to provide different regions of the device with different optical properties in the second state and/or in the first state.

Alternatively, at least one further piezoelectric layer is applied to the reflector layer prior to the step of contacting, the piezoelectric layers covering different parts of the reflector layer, each having different thicknesses relative to one another in the first and/or second states, such that the step of contacting completes alternative optical interference structures with alternative optical colour-shift properties for each piezoelectric layer.

Alternatively, the steps of applying are repeated at least once to produce two or more optical interference structures, a further piezoelectric layer being applied to the reflective layer upon each step of applying a piezoelectric layer, each optical interference structure being formed upon said further step of applying an absorber layer, each piezoelectric layer optionally having an alternative thickness to other piezoelectric layers present in the first and/or second states, such that each optical interference structure thus produced exhibits alternative colour-shift properties to the other optical interference structures forming part of the device.

In the methods of FIG. 7 and related embodiments described herein, the methods have been described with the reflector layer as the starting layer, with the piezoelectric layer applied to (e.g. printed on) the reflector layer, and the absorber layer applied in some way to the piezoelectric layer. It is important to note that in any of the embodiments described herein, the process may be effectively reversed. In other words, the starting layer may be the absorber layer, such that the method comprises the steps of:

providing an absorber layer;

printing a piezoelectric layer upon preselected portions of the absorber layer; and contacting the piezoelectric layer with reflector material to form a reflector layer on the piezoelectric layer to complete an optical interference structure over said preselected portions of the absorber layer. It follows that any of the optional or preferred features of the methods herein described may be applied to this alternative method. For example, the reflector layer may be formed from a web coated with reflector material with a release layer between the reflector material and the web, such that contacting the piezoelectric layer with the reflector material causes release of the reflector material from the web and completion of an optical interference structure. Any of the embodiments described above may be applied to such methods, without limitation.

Thus the present invention encompasses any method for the production of the piezoelectric layer-containing security devices disclosed herein. Moreover, the invention encompasses any method for imparting piezoelectric properties to the piezoelectric layer. Indeed, the piezoelectric properties of a piezoelectric layer may be induced in the layer either before, during or after the piezoelectric layer is applied to a reflector layer (or absorber layer). For example, in selected embodiments the piezoelectric properties of the piezoelectric layer are formed prior to the step of applying the layer by whatever means to a reflector layer, by the steps of:

providing a polymer layer on a release layer;

placing an electrical potential difference across the polymer layer on the release layer, thereby to polarize the polymer layer and impart piezoelectric properties to the layer; and releasing the polymer layer ready for the step of applying.

In still further embodiments the piezoelectric properties of the piezoelectric layer may be formed after, or at the same time as, the piezoelectric layer is applied to the reflector layer, by the steps of:

placing an electric potential difference across the piezoelectric layer formed (or being formed) on the reflector layer. Preferably, a high voltage or perhaps more than 1000 v is used to polarize the layer. Preferably, to assist the process the material of the layer has a low viscosity at least during exposure to the high electrical potential difference. In selected embodiments the low viscosity may be achieved by heating the material of the layer to above its Tg point (this is sometimes achieved with an annealing temperature for the layer of from 80-120 degrees C. In other embodiments the low viscosity may be achieved by retention of a degree of solvent in the piezoelectric layer after it has been placed or printed ready for polarization.

Figure 8:
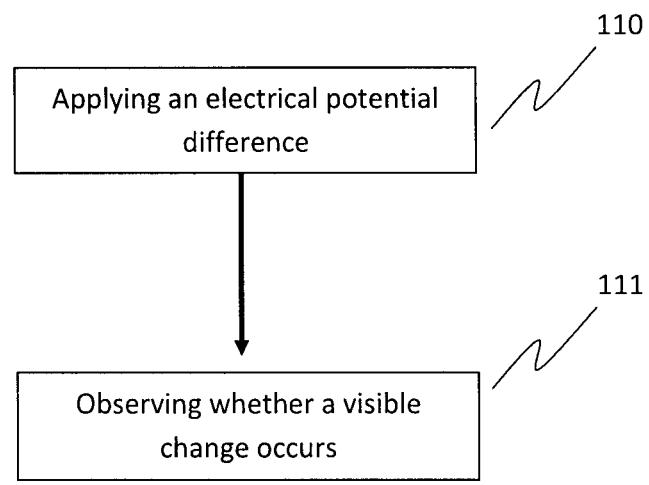
FIG. 8 illustrates a method for checking the legitimacy of a security document.

Further exemplary embodiments are illustrated in FIG. 8, which provides for a method for checking whether a security document is a legitimate or counterfeit document, the security document comprising at least one optically variable device as described herein visible on at least one side thereof, the method comprising the steps of:

in step 110 applying electrical potential difference to at least one optically variable device; and in step 111 observing whether the electrical potential difference causes a visible change in the appearance of the optically variable device, wherein any visible change is indicative that the security document is a legitimate document.

Optionally in step 111 the observing comprises visual inspection of the optically variable device upon application and/or removal of the electrical potential difference.

Furthermore, in the example methods described with reference to FIG. 8, the step of applying an electrical potential difference across the security document comprises the steps of:

positioning electrodes each side of the document; and applying a voltage across the electrodes thus to cause a piezoelectric layer of at least one optically variable device present on the security document to change from a first to a second state. Optionally, in the step of positioning, one of the electrodes is the reflector layer. Optionally, one of the electrodes is in contact with the absorber layer.

In alternative embodiments the step of positioning the electrodes does not involve contact between the electrodes and the optically variable device of the invention. These embodiments are illustrated schematically with reference to FIGS. 9 and 10.

Figure 9:
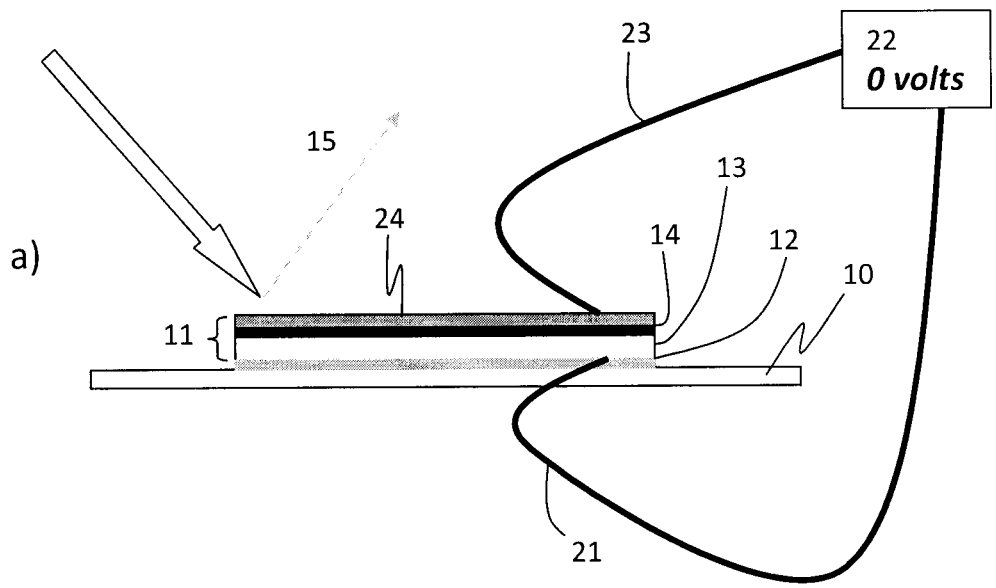
FIG. 9 illustrates a cross-sectional view of a security document incorporating an example security device associated with a device for checking a legitimacy of the document.
Figure 9:
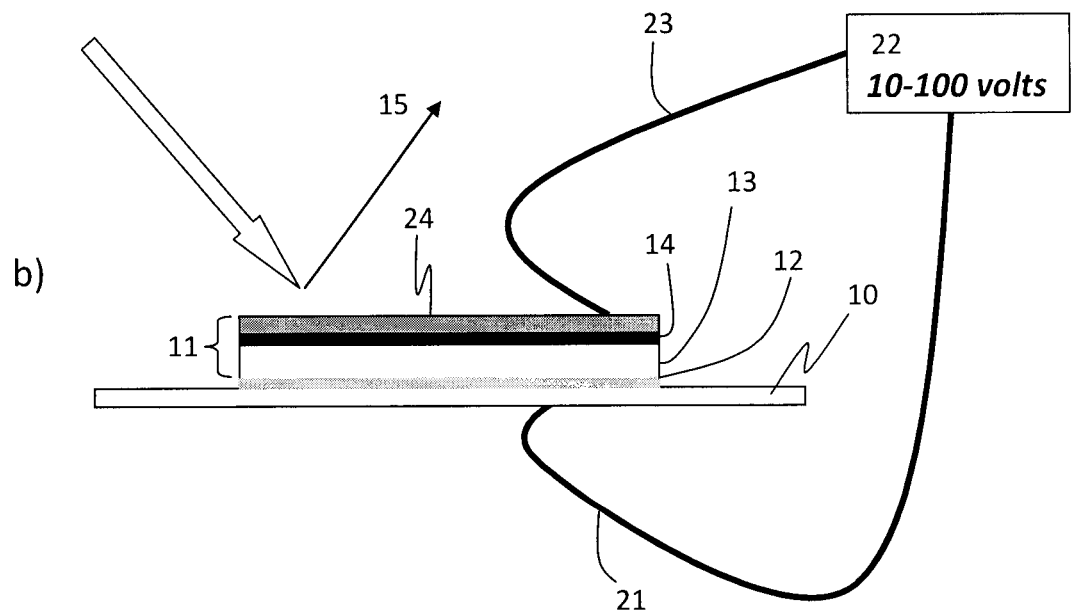

In FIG. 9a there is shown a core material of a security document 10 in contact with a security device or optical interference structure 11 as herein described and illustrated. As shown wire 21 connects power supply 22 to reflector layer 12 comprising aluminum, such that reflector layer functions as a bottom electrode. Furthermore, wire 23 connects power supply 22 to a top electrode 24 itself in contact (both physical and electrical contact) with absorber layer 14. In this way, top electrode 24 effectively acts in concert with absorber layer 14 to provide a top electrode component. In the embodiment shown in FIG. 9, an absorber layer comprising for example a layer of Inconel only 6 nm thick would have insufficient capacity (i.e. too much resistance) to function in itself as a top electrode. The top electrode 24 may comprise any material, and be applied by any means. For example, transparent top electrodes may be applied by sputtering over the top of an Inconel absorber layer, and may comprise materials such as but not limited to a polyethylene dioxythiophene (PEDOT) dispersion sold by HC Stark under the trade name Baytron P™.

In FIG. 9a the power supply is shown to provide 0 volts of electrical potential difference. FIG. 9b, in contrast, illustrates the same arrangement as FIG. 9a except that power supply 22 now provides an electrical potential difference of from 10-100 volts. This in turn causes piezoelectric layer 13 to shift from a first state to a second state, and thus adopt an increased thickness of 400 nm: sufficient to induce a gold-green colour shift in the overall device 11. Removal of the electrical potential difference from power supply 22 would cause the device to revert to the first state shown in FIG. 9a. Thus, application of an electrical potential different in this embodiment causes as increase in thickness of piezoelectric spacer layer 13. Whilst this contrasts to the embodiments previously illustrated in the drawings, the invention is not limited in this regard: different piezoelectric spacer layers may be configured to achieve alternative changes of state (first to second and back) according to their response to an increase of electrical potential difference.

Figure 10:
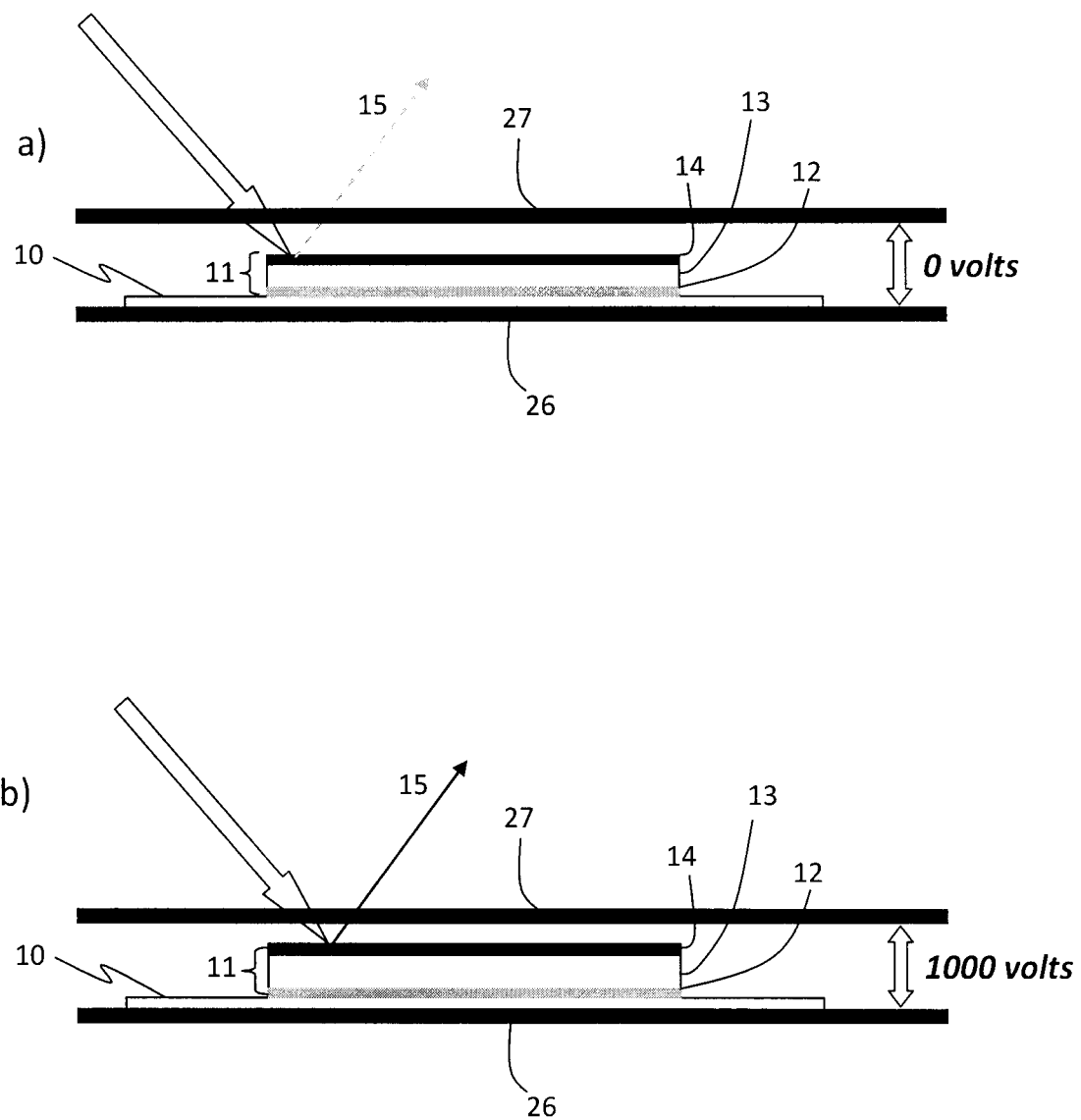
FIG. 10 illustrates a cross-sectional view of a security document incorporating an example security device associated with a device for checking a legitimacy of the document.

FIG. 10 illustrates the same arrangement as FIG. 9, except that the wires 21 and 23 (and electrode 24) are absent, replaced by an electrode free design in which the electric field generated by an electrical potential difference in itself sufficient to cause the piezoelectric spacer layer to transition between a first and second state. In FIG. 10a there is shown a core material of a security document 10 together with optically variable device 11. Whilst the core material 10 rests upon bottom plate 26 it insulates reflector layer 12 from direct electrical contact with the reflector layer 12. Top plate 17 is spaced (e.g. by air) from absorber layer 14. In the absence of an electrical potential different the piezoelectric layer 13 remains in a first state. However, as shown in FIG. 10b application of a high electrical potential difference of 1000 volts across electrodes 26 and 27 causes the piezoelectric layer to transition from a first state to a second state by virtue of the external electrical field generated. This in turn results in the generation of sufficient electrical potential across the piezoelectric layer for the transition to occur from the first to the second state, such that the piezoelectric layer adopts a thickness of 400 nm: sufficient to result in colour shift properties denoted by arrows 15.

The embodiment illustrated in FIG. 10 may present a useful practical embodiment of the invention, since the electrodes 26 and 27 may form part of a device for checking the legitimacy of, for example, bank notes. A person wishing to verify the legitimacy of a bank note may simply slide or guide the note by hand into the device between two concealed plates, and observe a colour shift in the associated security device without need to connect electrodes to the bank note. Thus, the procedure for checking the bank note may be as simple as current procedures involving a UV lamp.

Whilst various embodiments of security devices, security documents, as well as methods for their production and use, are described and illustrated herein, the scope of the appended claims is not limited to such embodiments, and the invention encompasses further embodiments readily obtainable in view the teachings presented herein.

The invention claimed is:

1. An optically variable security device comprising an optical interference structure that modifies incident visible light such that selected visible wavelengths of light exit from the device as an angle-dependent emission, that varies according to a strength of an electric field impinging upon the device, the device comprising:
   a piezoelectric layer that is changeable in thickness from a first state to a second state upon an exposure to, or a variation of the electric field, the thickness of the piezoelectric layer being less than 650 nanometers in at least one of said first and second states;
   a reflector layer comprising a reflective material in direct contact with the piezoelectric layer, to reflect said incident visible back into the piezoelectric layer for transmission therethrough; and
   an absorber layer in direct contact with and covering the piezoelectric layer, where present, so that the piezoelectric layer spaces the absorber layer from the reflector layer, at least some of the light reflected by the reflector layer and transmitted through the piezoelectric layer absorbed by the absorber layer;
   such that the reflector layer, the piezoelectric layer and the absorber layer together form the optical interference structure when the piezoelectric layer is in at least one of said first and second states, thereby to achieve said angle-dependent emission, that varies according to the strength of the electric field impinging upon the device.

2. The optically variable security device of claim 1, wherein the piezoelectric layer adopts said first state absent any electric potential difference across the piezoelectric layer.

3. The optically variable security device of claim 1, wherein the piezoelectric layer is applied to the reflector layer under atmospheric conditions.

4. The optically variable security device of claim 1, wherein the optical interference structure in at least one of said first and second states is a Fabry-Perot optical cavity.

5. The optically variable security device of claim 1, wherein the device comprises further optical interference structures to form a multilayer stack.

6. The optically variable security device of claim 1, wherein the layers together in at least a portion of the device form the optical interference structure in both said first state and in said second state, and transition of the piezoelectric layer between said first and second states causes a colour shift in an observed colour of at least a portion of the device.

7. The optically variable security device of claim 1, wherein the layers of least a portion of the device together form the optical interference structure only in said second state, such that a transition to said first state disrupts said optical interference structure resulting in a change, reduction or loss of colour in at least a portion of the device.

8. The optically variable security device of claim 1, wherein the layers of least a portion of the device together form the optical interference structure only in said first state, such that transition to said second state disrupts said optical interference structure resulting in a change, reduction or loss of colour in at least a portion of the device.

9. The optically variable security device of claim 1, wherein the reflector layer comprises a metallic layer, selected from: a metal, a metal alloy, aluminum, chromium, nickel, Inconel, silver, and gold.

10. The optically variable security device of claim 1, wherein the reflector layer reflects from 1-100% of light incident thereupon.

11. The optically variable security device of claim 1, wherein the piezoelectric layer comprises a crystal or polymer, and at least one adhesive material selected from: acrylated urethanes, methacrylate esters, mercapto-esters and a UV curable adhesives.

12. The optically variable security device of claim 1, wherein the absorber layer comprises at least one material selected from the group consisting of Inconel, chromium, aluminum, silver and nickel.

13. The optically variable security device of claim 1, wherein the absorber layer permits transmission therethrough of from 1-99% of light incident thereupon.

14. The optically variable security device of claim 1, wherein the piezoelectric layer is formed on said reflector layer by Gravure printing.

15. The optically variable security device of claim 1, wherein the piezoelectric layer has a non-uniform thickness when in said second state or in said first state, such that different parts of the piezoelectric layer exhibit different colour-shift properties.

16. Use of an optically variable security device of claim 1, as a security feature of a security document.

17. A security document comprising:
a core material; and
at least one optically variable security device of claim 1 affixed to at least one side of the core material, or at least partially embedded into the core material, such that the at least one optically variable security device is at least partly visible in reflected light from said at least one side.

18. The security document of claim 17, wherein the core material comprises at least one material selected from the group consisting of: paper, polymer, plastic, and combinations or hybrids thereof.

19. A method for producing act the optically variable security device of claim 1, the method comprising the steps of:
providing the reflector layer;
applying the piezoelectric layer upon preselected portions of the reflector layer, the piezoelectric layer changeable between the first state and the second state upon an exposure to or a variation of the electric field; and
applying the absorber layer upon the piezoelectric layer where present thereby to complete the optical interference structure over said preselected portions of the reflector layer when the piezoelectric layer is in at least one of the first and second states;
wherein optionally the absorber layer may be applied to the piezoelectric layer before the piezoelectric layer is applied to the reflector layer.

20. The method of claim 19, wherein the step of applying the piezoelectric layer comprises Gravure printing.

21. The method of claim 19, wherein the step of applying the absorber layer comprises contacting the piezoelectric layer with an absorber material coated on a web, to cause a release of the absorber material from the web and an adhesion of the absorber material to the piezoelectric layer where present, by pressing the coated web and piezoelectric layer together using a roller.

22. The method of claim 19, wherein the piezoelectric layer comprises a UV curable material, the method further comprising the step of:
curing the piezoelectric layer with UV radiation.

23. The method of claim 21, wherein the piezoelectric layer is printed with a non-uniform thickness in said second state or in said first state, thereby to provide different regions of the device with different optical properties in said second state or in said first state.

24. The method of claim 21, wherein at least one further piezoelectric layer is applied to the reflector layer prior to the step of contacting, the piezoelectric layers covering different parts of the reflector layer, each having different thicknesses relative to one another in said first state or in said second state, such that the step of contacting completes alternative optical interference structures with alternative optical colour-shift properties for each piezoelectric layer.

25. The method of claim 19, wherein the steps of applying are repeated at least once to produce two or more optical interference structures, a further piezoelectric layer being applied to the reflective layer upon each step of applying a piezoelectric layer, each optical interference structure being formed upon said further step of applying an absorber layer, each piezoelectric layer optionally having an alternative thickness to other piezoelectric layers present in said second state or in said first state, such that each optical interference structure thus produced exhibits alternative colour-shift properties to the other optical interference structures forming part of the device.

26. The method of claim 19, wherein the piezoelectric properties of the piezoelectric layer are formed prior to the step of applying, by the steps of:
providing a polymer layer on a release layer;
placing an electrical potential difference across the polymer layer thereby to polarize the polymer layer; and
releasing the polarized polymer layer;
wherein the step of applying the piezoelectric layer upon preselected portions of the reflector layer comprises adhering the released, polarized polymer layer to the reflector layer via an adhesive layer.

27. The method of claim 19, wherein piezoelectric properties of the piezoelectric layer are formed after, or at the same time as, the piezoelectric layer is applied to the reflector layer, by the steps of:
placing an electric potential across the piezoelectric layer formed on the reflector layer.

28. The method of claim 27, wherein the step of placing an electric potential comprises the steps of:
positioning electrodes above and below a horizontal plane of the piezoelectric layer during or after its application to the reflector layer along with heating the polymer layer to a temperature at or greater than a glass transition temperature of the polymer layer;
applying a voltage across the electrodes during a printing of the piezoelectric layer and prior to an evaporation of all of a solvent thus to polarize the piezoelectric layer.

29. The method of claim 28, wherein one of the electrodes is the reflector layer.

30. The method of claim 28, wherein one of the electrodes is in contact with the absorber layer.

31. A method for checking whether a security document is a legitimate or counterfeit document, the security document comprising at least one optically variable security device of claim 1 visible on at least one side thereof, the method comprising the steps of:
applying an electrical potential difference across the at least one optically variable device; and
detecting by a scanning device whether the electrical potential difference causes a visible change in an appearance of the optically variable security device, wherein any visible change is indicative that the security document is a legitimate document.

32. The method of claim 31, wherein the step of observing comprises an inspection of the optically variable security device upon an application or a removal of the electrical potential difference.

33. The method of claim 31, wherein the step of applying an electric potential difference comprises the steps of:

positioning electrodes above and below a horizontal plane of the document; and applying a voltage across the electrodes thus to cause the piezoelectric layer of the at least one optically variable security device present on the security document to change from a first to a second state.

34. The method of claim 31, wherein one of the electrodes is the reflector layer.

35. The method of claim 31, wherein one of the electrodes is in contact with the absorber layer.

\* \* \* \* \*